United States Patent [19]

Blankenship

[11] 3,869,413

[45] Mar. 4, 1975

[54] FLEXIBLE POLYURETHANE FOAMS
[75] Inventor: Larry Thomas Blankenship, Angleton, Tex.
[73] Assignee: The Dow Chemical Company, Midland, Mich.
[22] Filed: Mar. 4, 1974
[21] Appl. No.: 448,166

Related U.S. Application Data
[63] Continuation-in-part of Ser. No. 410,136, Oct. 26, 1973.

[52] U.S. Cl. ...260/2.5 BE, 260/2.5 AP, 260/2.5 AM, 260/2.5 AQ
[51] Int. Cl. ...................... C08g 22/44, C08g 41/04
[58] Field of Search .. 260/2.5 BE, 2.5 AM, 2.5 AQ, 260/2.5 AP

[56] References Cited
UNITED STATES PATENTS

| 3,576,706 | 4/1971 | Baumann | 260/2.5 AM |
| 3,738,953 | 6/1973 | Anorga | 260/2.5 AM |
| 3,755,211 | 8/1973 | Fabris | 260/2.5 BE |
| 3,772,222 | 11/1973 | Steward | 260/2.5 AM |
| 3,775,350 | 11/1973 | Juhas | 260/2.5 AM |

OTHER PUBLICATIONS

"Niax Polyol 31-45 a Vinyl Resin Reinforced Polyol for Flexible Urethane Foam," Union Carbide Product Information Bulletin, F41322A, Feb. 1970, p. 186.

Primary Examiner—Donald E. Czaja
Assistant Examiner—C. Warren Ivy
Attorney, Agent, or Firm—James G. Carter

[57] ABSTRACT

The physical properties of flexible polyurethane foams can be improved by the addition to the polyol of from 2-25 weight percent of a solid polymer or copolymer of an ethylenically unsaturated monomer free from groups reactive with NCO groups.

22 Claims, No Drawings

FLEXIBLE POLYURETHANE FOAMS

This application is a continuation-in-part of my previous application Ser. No. 410,136 filed Oct. 26, 1973 now abandoned.

The present invention pertains to flexible polyurethane foams.

It is an object of the present invention to provide flexible polyurethane foams with an improvement in one or more of the physical properties including tear strength, tensile strength, elongation, and indentation load deflection (ILD).

It is another object to provide highly resilient, flexible polyurethane foams without the requirement of a "crosslinker" compound such as 4,4'-methylene(bis)-2-chloroaniline or other suitable crosslinker, although a crosslinker may be used to improve the processing characteristics of the foam system.

The flexible polyurethane foams of the present invention comprises those prepared by subjecting to foaming conditions a composition comprising 1. a polyol composition consisting essentially of
   A. from about 50 to about 98, preferably from about 85 to about 96 parts by weight of a polyether polyol having from 2 to about 3 hydroxyl groups or mixtures of such polyols having an OH equivalent weight of from about 900 to about 2300 and preferably from about 1000 to about 1700 and
   B. from about 50 to about 2, preferably from about 15 to about 4 parts by weight of a solid polymer or copolymer of one or more ethylenically unsaturated monomers free from groups reactive with NCO or OH under urethane-forming conditions, said solid polymer or copolymer having a molecular weight of at least about 5,000, preferably at least about 50,000; and
2. an organic polyisocyanate in an amount to provide an NCO:active hydrogen ratio of about 0.80:1 to 1.5:1.

The highly resilient, flexible polyurethane foams of the present invention have a resiliency of at least about 50% and a modulus of at least about 2.3 and result from subjecting to foaming conditions a composition comprising
1. A. from about 50 to about 98, preferably from about 85 to about 96 parts by weight of a primary hydroxyl-containing polyether triol or mixture of such triols having an OH equivalent weight of from about 900 to about 2300 and preferably from about 1000 to about 1700 and
   B. from about 50 to about 2, preferably from about 15 to about 4 parts by weight of a solid polymer or copolymer of one or more ethylenically unsaturated monomers free from groups reactive with NCO or OH under urethane-forming conditions, said solid polymer or copolymer having a molecular weight of at least about 5,000, preferably at least about 50,000;
2. an organic polyisocyanate consisting essentially of
   A. from about 50 to 100% and preferably from about 75 to 100% by weight of 2,4-toluene diisocyanate, 2,6-toluene diisocyanate, NCO-containing prepolymers thereof or mixtures thereof, and
   B. from 0 to about 50% and preferably from about 0 to 25% by weight of an organic polyisocyanate having an average functionality of at least 2,
3. from about 1.5 to about 5 and preferably from about 2.0 to about 3.0 parts by weight of water per 100 parts by weight of component 1,
4. from 0 to about 20 and preferably from about 5 to about 10 parts of a low boiling auxiliary blowing agent per 100 parts by weight of component 1,
5. from about 0.5 to about 4 parts by weight per 100 parts by weight of Component A of a tertiary amine catalyst,
6. from about 0.005 to about 1.5 parts by weight per 100 parts by weight of component 1 of a silicone oil cell control agent, and wherein components 1 and 2 are present in quantities so as to provide an NCO:active hydrogen ratio of from about 0.8:1.0 to about 1.3:1.0, preferably from about 0.95:1 to about 1.2:1.

Polyether polyols suitable for preparing the flexible foams of the present invention include those prepared by reacting a compound having from 2 to 3 active hydrogen atoms per molecule such as, for example, ethylene glycol, propylene glycol, glycerine, trimethylolpropane, hexanediol, hexanetriol, mixtures thereof and the like with an alkylene oxide or epihalohydrin or mixtures thereof in any order of addition such as, for example, ethylene oxide, 1,2-propylene oxide, 1,2-butylene oxide, 2,3-butylene oxide, epichlorohydrin, epibromohydrin, epiiodohydrin and the like.

The primary hydroxyl-containing polyether triols employed in the preparation of the highly resilient polyurethane foams include those described above.

Suitable polyisocyanates which can be employed in the preparation of the flexible polyurethane foams of the present invention include, for example,
polymethylene polyphenylisocyanate,
1,5-naphthalenediisocyanate,
cumene-2,4-diisocyanate,
4-methoxy-1,3-phenylenediisocyanate,
4-chloro-1,3-phenylenediisocyanate,
4-bromo-1,3-phenylenediisocyanate,
4-ethoxy-1,3-phenylenediisocyanate,
2,4'-diisocyanatodiphenylether,
5,6-dimethyl-1,3-phenylenediisocyanate,
2,4-dimethyl-1,3-phenylenediisocyanate,
4,4'-diisocyanatodiphenylether,
benzidinediisocyanate,
4,6-dimethyl-1,3-phenylenediisocyanate,
4,4'-diisocyanatodibenzyl,
9,10-anthracenediisocyanate,
3,3'-dimethyl-4,4'-diisocyanatodiphenylmethane,
2,6'-dimethyl-4,4'-diisocyanatodiphenyl,
2,4-diisocyanatostilbene,
3,3'-dimethyl-4,4'-diisocyanatodiphenyl,
3,3'-dimethoxy-4,4'-diisocyanatodiphenyl,
1,4-anthracenediisocyanate,
2,5-fluorenediisocyanate,
1,8-naphthalenediisocyanate,
2,6-diisocyanatobenzfuran,
2,4,6-toluenetriisocyanate, and
2,4,4'-triisocyanatodiphenylether,
isophoronediisocyanate,
dimers and trimers of toluene diisocyanate, and
crude or undistilled polyisocyanates.

Suitable NCO-containing prepolymers of 2,4- and 2,6-toluenediisocyanate which can be employed as the polyisocyanate component 2A includes those prepared by reacting an excess of the toluenediisocyanate with a substance having equivalent weight of from about 30 to about 2500 preferably from about 30 to about 300.

Suitable such active hydrogen-containing substances include for example, ethylene diamine, ammonia, methyl amine, aminoethylethanol amine, propylene diamine, ethylene glycol, propylene glycol, butylene glycol, hexane diol, pentanediol, bisphenols, halogen substituted bisphenols, neopentyl glycol, halogenated neopentyl glycol, adducts of such active hydrogen-containing substances with vic-epoxy-containing compounds such as for example, ethylene oxide, propylene oxide, 1,2-butylene oxide, 2,3-butylene oxide, styrene oxide, epichlorohydrin, epibromohydrin, phenyl glycidyl ether, butyl glycidyl ether, dibromophenyl glycidyl ether, mixtures thereof and the like.

It is preferred that the NCO-containing prepolymer contain from about 10% to about 45% free NCO groups by weight.

It should be understood that in the preparation of prepolymers from an excess of the toluene diisocyanate, that the resultant product will usually contain some unreacted toluene diisocyanate.

Other organic polyisocyanates that can be used are the polyisocyanates described in Canadian Pat. No. 700,026 and in U.S. Pat. No. 2,683,730; the phenyl indane diisocyanates which are described in U.S. Pat. No. 2,855,385, the organic diisocyanates and the organic triisocyanates which are described in U.S. Pat. No. 2,292,443; and the organic triisocyanates which are described in U.S. Pat. No. 2,929,794.

The polymers employed in the present invention can be prepared by the known processes of the latex or solution, dispersion or emulsion polymerization art.

Suitable monomers which may be employed in the preparation of the polymers include, for example, styrene, methyl methacrylate, ethyl methacrylate, methyl acrylate, butyl methacrylate, 2-ethylhexyl methacrylate, vinyl toluene, chlorostyrene, vinyl naphthalene, indene, vinyl cyclohexane, α-methyl styrene, vinyl acetate, vinyl ethyl ether, acrylonitrile, methacrylonitrile, mixtures thereof and the like.

When the polymer is in the form of a latex, the average particle size can be in the range of from about 600 to about 7000, preferably from about 1000 to about 5500 A.

Preferred polymers include those containing from about 0% to about 97% and preferably from about b 30% to about 60% by weight of a vinyl aromatic compound with from about 3 to about 100%, preferably from about 40% to about 70% by weight of acrylonitrile, methacrylonitrile, or a 1-8 carbon atom ester of methacrylic acid.

When the polymer is added to the polyol in the form of a latex or as a solution, emulsion or dispersion in an organic solvent free from groups reactive with OH groups, any excess water or other medium is removed by conventional means such as, for example, by flashing under vacuum prior to mixing the polyol with the other urethane-forming components of the foam-forming formulation.

Suitable such organic solvents include, for example, xylene, toluene, commercially available mixed solvents such as Isopar, heptane, 2,2,4-trimethylpentane, bromobenzene, chlorobenzene, methylcyclohexane, dioxane, butylacetate, isoamylacetate, octane, isooctane, nonane, decane, mixtures thereof and the like.

When water is employed as the medium in the polymer preparation and subsequently added to the polyol, all of the water above that portion required as a blowing agent is removed or all of the water is removed and the amount of water required for blowing is then added during the mixing of the foam-forming mixture.

Suitable auxiliary blowing agents which may be employed in the preparation of the foams of the present invention include, for example, aliphatic hydrocarbons boiling below 110°C. or halogenated aliphatic hydrocarbons boiling below 110°C. such as dichlorodifluoromethane, trichlorofluoromethane, hexane, hexene, or pentane as the blowing or foaming agent. Suitable foaming agents are disclosed in U.S. Pat. No. 3,072,582.

Suitable tertiary amine catalysts which may be employed in the preparation of the foams of the present invention include, for example, triethylenediamine, N-ethylmorpholine, N(dimethylaminoethyl)piperazine, N,N'-bis-(dimethylaminoethyl) piperazine, tetramethyl butanediamine, dimethylethanolamine, bis(2-dimethylaminoethyl)ether, mixtures thereof and the like.

Organotin catalysts such as stannous octoate, dibutyltin dilaurate and the like may also be employed together with the tertiary amine catalyst if desired.

Inorganic and organic fillers such as, for example, calcium carbonate, barytes, sand, expandable polystyrene beads, and the like may be included in the foams of the present invention.

Fire retardant agents such as, for example, tris(2,3-dibromopropyl)phosphate; tris(2-chloroethyl) phosphate, tris(dichloropropyl)phosphate, mixtures thereof, and the like may also be employed in the foams of the present invention.

The following examples are illustrative of the present invention.

EXAMPLES 1–11 AND COMPARATIVE EXPERIMENTS A–E

In each of the following examples, all of the components except the isocyanate were thoroughly blended together. Then the isocyanate was quickly added and after stirring for several seconds the mixture was poured into a cardboard box or preheated aluminum mold and the mixture allowed to foam. The isocyanate-:active hydrogen ratio was about 1:1 to about 1.05:1.

In each instance, the polymer was added to the polyol in the form of a latex and the water removed therefrom by heating under a vacuum. Thereafter, more polyol was added to adjust the polymer concentration to the desired level.

The foam formulations are given in Table I and the properties of the resultant foam are given in Table II. The densities reported, except as otherwise indicated, are core densities, i.e. the density of an interior section of the foam.

TABLE I

| FORMULATION | EXAMPLE 1 | EXAMPLE 2 | EXAMPLE 3 | A/0.035 EXAMPLE 4 | EXAMPLE 5* | COMPARATIVE EXPERIMENT A | COMPARATIVE EXPERIMENT B |
|---|---|---|---|---|---|---|---|
| Polyol, type/grams | A/94 | A/94 | A/60 B/36 | A/94 | A/91 | A/100 | A/100 |
| Polymer, type/grams | A/6 | B/6 | A/4 | C/6 | C/9 | none | none |
| Polyisocyanate, type/grams | A/24.32 B/6.08 | A/24.32 B/6.08 | A/24 B/6 | A/24.56 B/6.14 | A/24.32 B/6.08 | A/24.56 B/6.14 | A/24.56 B/6.14 |
| Catalyst, type/grams | A/0.6 B/0.1 C/0.4 | A/0.6 B/0.1 C/0.4 | A/0.6 B/0.1 C/0.4 | A/0.2 B/0.25 | A/0.6 B/0.1 C/0.4 | A/0.6 B/0.1 C/0.4 | A/0.6 B/0.1 C/0.4 |
| Water, grams | 2.5 | 2.5 | 2.5 | 2.5 | 2.5 | 2.5 | 2.5 |
| Silicone oil, type/grams | A/0.05 | A/0.05 | A/0.03 | A./0.035 | A/0.05 | A/0.03 | A/0.05 |

| FORMULATION | COMPARATIVE EXPERIMENT C | EXAMPLE 6[a] | COMPARATIVE EXPERIMENT D[b] | EXAMPLE 7[c] | EXAMPLE 8[d] | COMPARATIVE EXPERIMENT E[e] |
|---|---|---|---|---|---|---|
| Polyol, type/grams | A/100 | A/94 | A/100 | A/94 | A/94 | A/100 |
| Polymer, type/grams | none | D/6 | none | E/6 | D/6 | none |
| Polyisocyanate, type/grams | A/24.56 B/6.14 | A/20.22 B/10.88 | A/20.22 B/10.88 | A/21.26 B/11.44 | A/25.28 B/6.32 | A/25.28 B/6.32 |
| Catalyst, type/grams | A/0.7 B/0.4 C/0.1 | A/0.6 B/0.15 | A/0.8 B/0.05 | A/0.5 B/0.08 | A/0.5 B/0.08 | A/0.8 B/0.06 |
| Water, grams | 2.5 | 2.5 | 2.5 | 2.5 | 2.5 | 2.5 |
| Silicone oil, type/grams | A/0.03 | A/0.03 | A/0.03 | A/0.03 | A/0.03 | A/0.03 |

| FORMULATION | EXAMPLE 9 | EXAMPLE 10 | EXAMPLE 11 |
|---|---|---|---|
| Polyol, type/grams | A/92 | A/92 | A/92 |
| Polymer, type/grams | F/8 | G/8 | H/8 |
| Polyisocyanate, type/grams | C/33.2 | C/33.2 | C/33.2 |
| Catalyst, type/grams | A/0.45 B/0.08 D/0.25 E/0.03 | A/0.45 B/0.08 D/0.25 E/0.03 | A/0.45 B/0.08 D/0.25 E/0.03 |
| Water, grams | 2.5 | 2.5 | 2.5 |
| Silicone oil, type/grams | B/2.0 | B/2.0 | B/2.0 |

* This formulation was poured into an aluminum mold heated to a temperature of 122°C.
[a] This formulation was poured into an aluminum mold preheated to a temp. of 128°C.
[b] This formulation was poured into an aluminum mold preheated to a temp. of 124°C.
[c] This formulation, also contained 0.5 grams of diethanol amine as a crosslinker, was poured into an aluminum mold preheated to a temp. of 128°C.
[d] This formulation also contained 0.5 grams of diethanol amine as a crosslinker and was poured into an aluminum mold preheated to a temp. of 129°C.
[e] This formulation also contained 0.5 grams of diethanol amine as a crosslinker and was poured into an aluminum mold preheated to a temperature of 126°C.

TABLE II

| PROPERTY | EX. 1 | EX. 2 | EX. 3 | EX. 4 | EX. 5 | COMPARATIVE EXPERIMENT A | COMPARATIVE EXPERIMENT B[g] | COMPARATIVE EXPERIMENT C |
|---|---|---|---|---|---|---|---|---|
| Density, lbs/ft$^3$ | 2.41 | 2.45 | 2.38 | 2.5 | 2.68 | 2.83 | 3.53 | 2.59 |
| Tensile Strength, psi | 17.8 | 16.7 | 16.9 | 16.5 | 23 | 14.10 | 12.4 | 14.27 |
| Elongation, % | 248 | 254 | 240 | 208 | 193 | 175 | 130 | 209 |
| Tear Resistance, lbs/in. | 2.13 | 2.03 | 2.32 | 3.22 | 2.52 | 1.88 | 2.35 | 1.83 |
| Resiliency,[a] % | 61 | 61 | 62 | 55 | 61 | 60 | 49 | 60 |
| ILD, 25% | 21.2 | 21.0 | 17.5 | 19.5 | 37.5 | 21.5 | 17 | 19 |
| 65% | 47 | 46.3 | 40.5 | 46.5 | 92.0 | 54.3 | 68 | 42.7 |
| Modulus[b] | 2.22 | 2.20 | 2.31 | 2.38 | 2.45 | 2.53 | 4 | 2.24 |
| Air Flow, ft$^3$/min. | 1.4 | 1.6 | 1.7 | 1.0 | 1.7 | 1.0 | 0.5 | 1.2 |

| PROPERTY | EX. 6 | COMPARATIVE EXPERIMENT D | EX. 7 | EX. 8 | COMPARATIVE EXPERIMENT E | EXAMPLE 9 | EXAMPLE 10 | EXAMPLE 11 |
|---|---|---|---|---|---|---|---|---|
| Density, lbs/ft$^3$ | 2.75[c] | 2.94[c] | 2.94[c] | 2.79 | 2.64 | 2.99 | 2.98 | 2.93 |
| Tensile Strength, psi | 17.9 | 13.1 | 18.6 | 15.1 | 18.2 | 22.0 | 21.6 | 20.8 |
| Elongation, % | 176 | 201 | 171 | 139 | 159 | 140 | 145 | 138 |
| Tear Resistance, lbs/in. | 1.98 | 1.72 | 1.92 | 1.9 | 1.58 | 2.00 | 1.97 | 1.97 |
| Resiliency,[a] % | 62 | 62 | 65 | 61 | 67 | 62 | 59 | 59 |
| ILD, 25% | 27 | 28 | 33 | 32.5 | 25 | 33 | 40 | 42 |
| 65% | 74 | 74 | 89 | 95 | 65 | 100 | 102 | 106 |
| Modulus[b] | 2.74 | 2.64 | 2.7 | 2.92 | 2.6 | 3.03 | 2.55 | 2.55 |
| CLD[d], 25% | N.D.[f] | N.D. | N.D. | N.D. | N.D. | 6.1 | 6.9 | 7.1 |
| 65% | N.D. | N.D. | N.D. | N.D. | N.D. | 17.6 | 17.6 | 17.4 |
| Modulus[e] | N.D. | N.D. | N.D. | N.D. | N.D. | 2.89 | 2.55 | 2.45 |
| Air Flow, ft$^3$/min. | 2 | 1.7 | 2.2 | 2.8 | 1.6 | 0.8 | 0.7 | 0.8 |

[a] Dropping ball resiliency.
[b] 65% ILD ÷ 25% ILD.
[c] These densities were overall densities i.e. densities calculated from the wt. and vol. of the entire foam.
[d] CLD is Compression Load Deflection (4" × 4" × 1" sample)
[e] 65% CLD ÷ 25% CLD.
[f] N.D. = Not Determined.
[g] This foam partially collapsed which is the reason why the modulus was 4; this foam is commercially unacceptable.

POLYOL A was the reaction product of glycerine with propylene oxide subsequently end-capped with about 5.2 moles of ethylene oxide per hydroxyl group. The polyol had an OH equivalent weight of about 1620.

POLYOL B was the reaction product of glycerine with propylene oxide end-capped with about 7 moles of ethylene oxide per hydroxyl group. The polyol had an average OH equivalent weight of about 2200.

POLYISOCYANATE A was an 80/20 mixture of 2,4-/2,6-toluene diisocyanate having an NCO equivalent weight of about 87.

POLYISOCYANATE B was a crude toluene diisocyanate having an NCO equivalent weight of about 105.5 to about 108.5.

POLYISOCYANATE C was a blend containing 80 wt. % of 80/20 2,4-/2,6-toluenediisocyanate and 20 wt. % polymeric polyisocyanate the blend having an NCO equivalent weight of about 94.7 (commercially available from Union Carbide Corporation as NIAX Isocyanate SF-58).

POLYMER A was a latex copolymer of 97% styrene and 3% acrylonitrile having an average molecular weight of greater than about 10,000. The average particle size was about 5220 A.

POLYMER B was a latex copolymer of 97% styrene and 3% methyl acrylate having an average molecular weight of greater than 10,000. The average particle size was about 5107 A.

POLYMER C was a latex copolymer of 85% styrene and 15% acrylonitrile having an average molecular weight of greater than about 10,000. The average particle size was about 5225 A.

POLYMER D was a copolymer of 73% styrene and 27% acrylonitrile having an average molecular weight of greater than about 10,000. The average particle size was about 676 A.

POLYMER E was a latex copolymer of 55% styrene and 45% acrylonitrile having an average molecular weight of greater than about 10,000. The average particle size was about 867 A.

POLYMER F was a latex copolymer of 45% styrene and 55% acrylonitrile having an average molecular weight of greater than about 10,000. The average particle size was about 706 A.

POLYMER G was a latex copolymer of the same composition as Polymer F except that the average particle size was about 1130 A.

POLYMER H was a latex copolymer of the same composition of Polymer F and Polymer G except that the average particle size was about 2093 A.

CATALYST A was a 33% solution of triethylenediamine in dipropylene glycol.

CATALYST B was bis(2-dimethylaminoethyl)ether.

CATALYST C was N-ethylmorpholine.

CATALYST D was an amine catalyst with total amine, milliequivalents/gm, 10.1 to 11.1 available commercially from Jefferson Chemical Company as Thancat DM-70.

CATALYST E was dibutyl tin dilaurate.

SILICONE OIL A was a dimethylsidoxane polymer having a viscosity at 77°F of 5 centistrokes. The silicone oil was employed as a 10% solution in dioctyl phthalate with the quantities indicated being the quantity of silicone oil.

SILICONE OIL B was a non-hydrolyzable surfactant available commercially from Union Carbide Corporation as NIAX L-5303.

I claim:

1. Flexible polyurethane foams prepared by subjecting to foaming conditions a composition comprising
  1. a polyol composition consisting essentially of
     A. from about 50 to about 98 parts by weight of a polyether polyol or mixture of such polyols having from 2 to 3 hydroxyl groups per molecule and an OH equivalent weight of from about 900 to about 2300 and
     B. from about 50 to about 2 parts by weight of a solid polymer of one or more ethylenically unsaturated monomers free from groups reactive with NCO or OH groups under urethane-forming conditions, said solid polymer having a molecular weight of at least about 5,000; said polyol composition having been prepared by adding Component (B) in the form of a latex having an average particle size of from about 1000 A to about 7000 A to Component (A) and subsequently removing water therefrom to the extent that the resulting mixture contains from zero to that quantity of water desired to be employed in the foaming reaction by the formation of $CO_2$ through reaction of such water with a polyisocyanate; and
  2. an organic polyisocyanate;
  wherein Components 1 and 2 are employed in quantities such that the NCO:active hydrogen ratio is from about 0.80:1 to about 1.5:1.

2. The foam of claim 1, wherein the NCO:active hydrogen ratio is from about 0.95:1 to about 1.2:1.

3. The foam of claim 2 wherein Component 1B is a copolymer containing styrene as one of the monomers.

4. The foam of claim 2 wherein Component 1B is a copolymer containing acrylonitrile as one of the monomers.

5. The foam of claim 2 wherein Component 1B is a copolymer of styrene and acrylonitrile.

6. The foam of claim 5 wherein said copolymer contains at least about 45% by weight of styrene.

7. The foam of claim 2 wherein said polymer is a copolymer of styrene and a 1–2 carbon atom alkyl ester of acrylic acid.

8. The foam of claim 7 wherein said copolymer contains 97% styrene.

9. The foam of claim 2 wherein said polymer is a copolymer of styrene and a 1–8 carbon atom alkyl ester of methacrylic acid.

10. The foam of claim 9 wherein said copolymer contains 97% styrene.

11. The polyurethane foam of claim 1 having a resiliency of at least about 50% and a modulus of at least about 2.3 resulting from subjecting to foaming conditions a composition comprising
  1. A polyol composition consisting essentially of
     A. from about 50 to about 98 parts by weight of a primary hydroxyl-containing polyether triol having an equivalent weight of from about 900 to about 2300 or mixture of such triols and
     B. from about 50 to about 2 parts by weight of a polymer prepared from one or more ethylenically unsaturated monomers free from groups reactive with NCO groups at urethane forming conditions, said polymer having a molecular weight of at least about 5,000;

said polyol composition having been prepared by adding Component B in the form of a latex having an average particle size of from about 1000 A to about 7000 A to Component (A) and subsequently removing water therefrom to the extent that the resulting mixture contains from zero to that quantity desired to be employed in the foaming reaction by the formation of $CO_2$ through reaction with a polyisocyanate;

2. an organic polyisocyanate consisting essentially of
   A. from about 50% to 100% by weight of 2,4-toluenediisocyanate, 2,6toluenediisocyanate, NCO-containing prepolymers thereof, or mixtures thereof, and
   B. from 0 to about 50% by weight of an organic polyisocyanate having an average functionality of at least 2,
3. from about 1.5 to about 5 parts by weight of water per 100 parts by weight of component 1,
4. from 0 to about 20 parts by weight of a low boiling auxiliary blowing agent per 100 parts by weight of component 1,
5. from about 0.5 to about 4 parts by weight per 100 parts by weight of Component 1 of a tertiary amine catalyst,
6. from about 0.005 to about 1.5 parts by weight per 100 parts by weight of Component 1 of a silicone oil cell control agent, and wherein Components 1 and 2 are present in quantities so as to provide as NCO:active hydrogen equivalent ratio of from about 0.8:1.0 to about 1.3:1.0.

12. The foam of claim 11, wherein Component 1A has an average equivalent weight of from about 1000 to about 1700. Component 1B has a molecular weight of at least about 15,000, Component 1A is present in quantities of from about 50 to about 98 parts by weight; Component 1B is present in quantities of from about 50 to about 2 parts by weight; Component 2A is present in quantities of from about 75 to about 100% by weight; Component 2B is present in quantities of from about 0 to 25% by weight; and the NCO:active hydrogen ratio is from about 0.95:1 to about 1.2:1.

13. The foam of claim 12 wherein Component 1B is a copolymer of styrene and acrylonitrile.

14. The foam of claim 13 wherein said copolymer contains about 45–97% styrene.

15. The foam of claim 13 wherein said copolymer contains 45–60% styrene.

16. The foam of claim 13 wherein said copolymer contains about 85–97% styrene.

17. The foam of claim 11 wherein said polymer is a copolymer of styrene and methyl acrylate.

18. The foam of claim 17 wherein said copolymer contains about 97% styrene.

19. The foam of claim 13 wherein said copolymer contains 85% styrene.

20. The foam of claim 13 wherein said copolymer contains 73% styrene.

21. The foam of claim 13 wherein said copolymer contains 55% styrene.

22. The foam of claim 13 wherein said copolymer contains 45% styrene.

* * * * *

PO-1050
(5/69)

UNITED STATES PATENT OFFICE
CERTIFICATE OF CORRECTION

Patent No. 3,869,413          Dated March 4, 1975

Inventor(s) Larry Thomas Blankenship

It is certified that error appears in the above-identified patent and that said Letters Patent are hereby corrected as shown below:

Column 3, line 1, after "having" insert --from 2 to about 4 active hydrogen atoms and an active hydrogen--.

Column 3, line 48, delete "b".

Table I, above Example 4, delete "A/0.035".

Column 7, line 62, change "dimethylsidoxane" to read --dimethylsiloxane--.

Signed and Sealed this twenty-fifth Day of November 1975

[SEAL]

Attest:

RUTH C. MASON
*Attesting Officer*

C. MARSHALL DANN
*Commissioner of Patents and Trademarks*